Oct. 25, 1932.  C. L. WILES  1,884,455
METHOD OF WELDING
Filed Jan. 31, 1928  2 Sheets-Sheet 1

INVENTOR.
Charles L. Wiles,
BY
ATTORNEY.

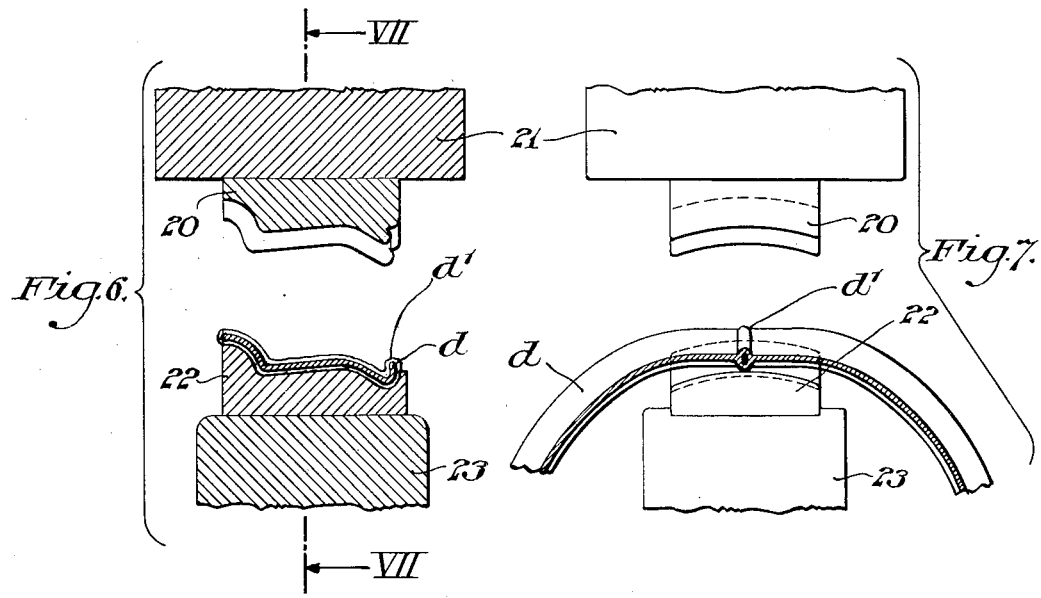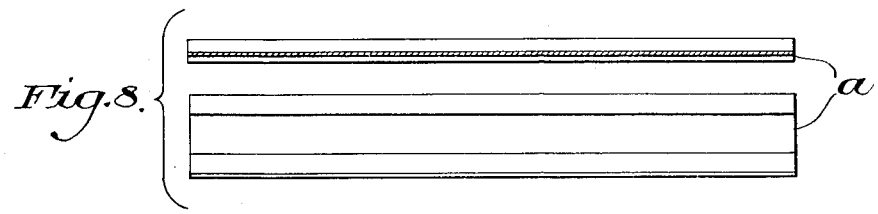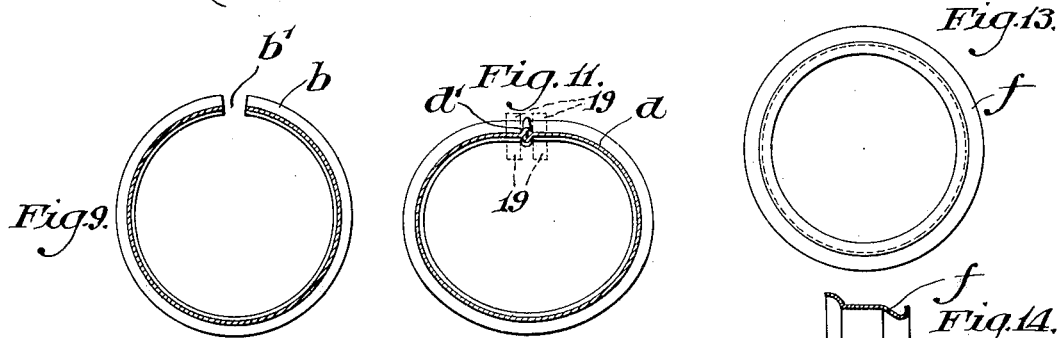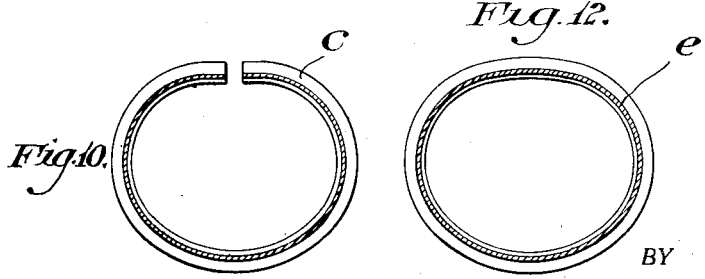

Patented Oct. 25, 1932

1,884,455

UNITED STATES PATENT OFFICE

CHARLES L. WILES, OF DETROIT, MICHIGAN, ASSIGNOR TO BUDD WHEEL COMPANY, OF PHILADELPHIA, PENNSYLVANIA, A CORPORATION OF PENNSYLVANIA

METHOD OF WELDING

Application filed January 31, 1928. Serial No. 250,852.

This invention deals with a method and apparatus for welding. The principal object thereof is the provision of an improved method and apparatus by means of which firmer and stronger welds of improved appearance may be made by electric butt welding. Another object of the invention is to provide a method whereby rings may be made substantially without a visible seam although initially formed from straight bar stock. Another object of the invention provides a process step wherein exact alignment of the ends of a split ring is secured to facilitate the welding operation by which the ring is made continuous. Another object consists of the provision of a process step obtaining reduction of the "flash", formed in the welding operation, by means of dies which reduce the said "flash" to the same cross section as that of the ring. Still another object consists in providing a method which combines the two foregoing steps. Other objects are the provision of apparatus whereby the above method may be carried out.

Rings made in the past by bending up flat stock and welding the ends, have always been open to the objection that the welding produces a roughened surface at the point of junction. This is especially true where rings are welded by means of the electric butt welding process wherein the heavy pressures and relatively prolonged heating necessary to effect a sound weld result in a pronounced spreading out of the metal at the point of welding into an irregular mass commonly called "flash". A great advantage of the present method is that it provides a means whereby electric butt welding may be used in the formation of rings and the disadvantageous formation of flash may be closely controlled and easily removed.

Further objects and the advantages of the invention will appear from the following description in which the preferred form of apparatus used in carrying out the method of the invention is illustrated. The attached drawings consisting of—

Figure 1:
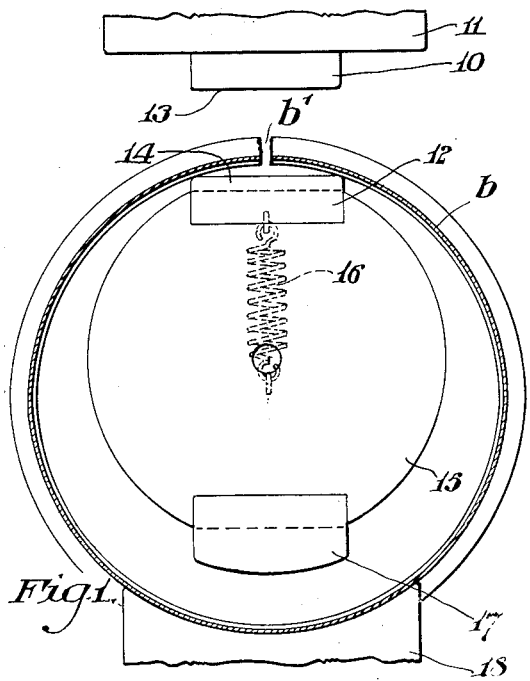

Figure 1, an elevation of one unit of the preferred form of apparatus used in the invention.

Figure 2:
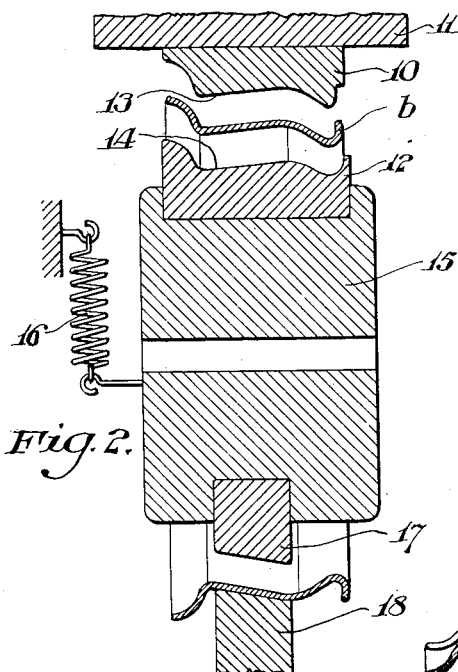

Figure 2, a vertical section of Figure 1.

Figure 3:
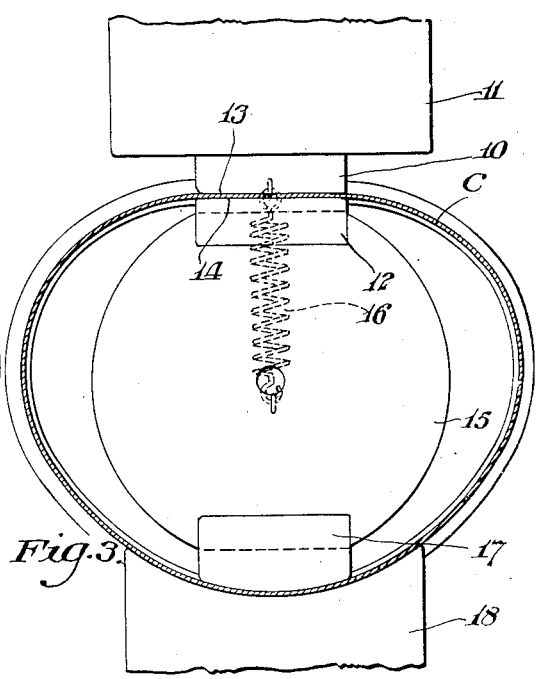
Figure 4:
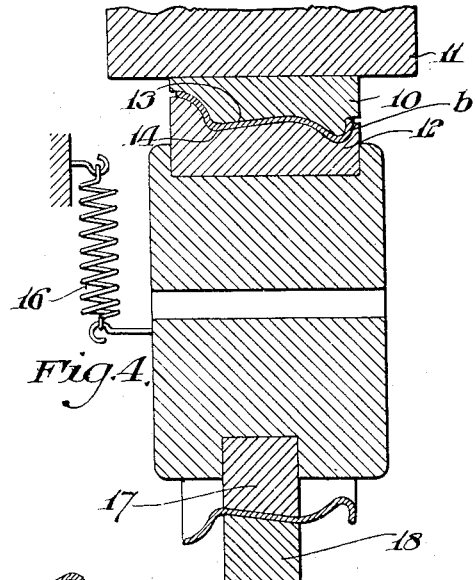

Figures 3 and 4, corresponding elevation and vertical sections similar to Figures 1 and 2, but taken in the closed position of the machine.

Figure 5:
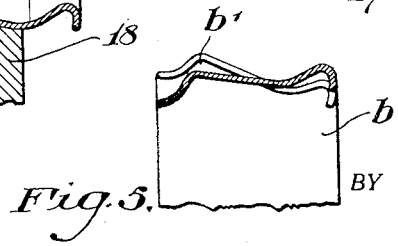

Figure 5, a view illustrative of the condition encountered and remedied by the practice of the invention.

Figures 6 and 7, longitudinal section and elevation of a second unit of the apparatus used, the ring in Figure 7 being illustrated in section taken on the line 7—7 of Figure 6, and Figures 8 to 14 inclusive, representing successive steps in the formation of a ring by the improved method in which there are shown respectively the bar stock cut to length, the roughly formed ring, the ring after formation by the first step of the improved method, the ring after welding, the ring after removal of the flash, and elevational and sectional views of the finished article.

In describing the invention an automotive rim of a well-known type has been chosen as illustrative.

According to the previously used method of manufacture, the rough stock "a", as shown in Figure 8, is roughly rolled up into a ring "b", as shown in Figure 9. The ring "b" of Figure 9 after its initial bending is rarely a true circle and still more rarely what might be called flat or co-planar, having a tendency to curl up into a spiral form during bending, and to have its section substantially distorted especially at the ends during the bending operation. As a result of these distortions the succeeding step of welding has been productive of an excessive amount of flash, since it is almost impossible to obtain contact of the split ends of the ring in the welding machine over their whole area. The welding, therefore, begins at one point and progresses over the area of the ring section until complete, which results in the metal first melted being laterally extruded to form the objectionable flash mentioned above. Following the welding operation it has heretofore been necessary to employ large numbers of men to chip or grind this flash off, whereupon it is possible to complete the rim to the form shown in Figures 13 and 14.

The present method does away with a great deal of the past difficulties. The first unit of the apparatus used to carry out the present method is shown in Figures 1 to 4, and comprises means for bringing the adjacent ends of the roughly formed ring into exact equivalence of section and into exact alignment, thus providing for substantially simultaneous welding over the entire area of ring; and providing a straight section of substantial extent, for the jaws of the welding machine to grip, thereby facilitating the welding operation to a still further degree. The said apparatus comprises a movable die 10 carried on the ram 11 of a conventional punch press or similar mechanism not shown. The said die 10 cooperates with a second die 12, both dies 10 and 12 having complementary surfaces 13, 14, of substantially plane formation (Figures 1 and 3) in the direction of the periphery of the ring "b" and of curvilinear formation at right angles thereto, (Figures 2 and 4), which dies are adapted to shape the adjacent ring ends to exactly the same cross section as the rest of the ring, and to straighten the said ring ends for a short distance on each side of the split "b'". The said second named movable die 12 is carried on a member 15 supported to move in line with the movement of the ram 11 bearing the first named die 10 and resiliently biased toward said die 10 by means of a spring 16. Opposite the second named die 12, on the sliding member 15 is a third die 17, which is curved in the direction of the periphery of the ring "b", which third die cooperates with a fixed die 18 to grip the ring "b" at a point opposite the split portion "b'" and hold it to its original curvature. To accomplish this, the curvature of these latter cooperating dies 17, 18, is the same as that of the ring "b". The said dies 17, 18, may have sections similar to that of the upper dies or substantially plane, their purpose being as mentioned above, merely to grip the ring without any tendency to shape it.

The operation of the machine is clearly shown by comparing Figures 1 and 2 with Figures 3 and 4. The ring "b" is inserted in the machine, resting on the fixed die 18 with its split portion "b'" between the upper forming dies 10, 12. Upon operation of the press, the ram 11 descends, gripping the split ends of the ring "b" between the forming dies, 10, 12, forming them to the same shape and pushing the upper half of the ring downward. This downward motion and the forming of the ring continues until the lower dies 17, 18 contact on the ring, as in Figures 3 and 4. In this operation it can be seen that the adjoining ends of the ring are flattened for a short space on each side of the split "b'", so as to be tangential to the rest of the ring and that the upper half of the ring is flattened to permit these tangential portions to become aligned. This operation completely corrects the state of affairs shown by way of example in Figure 5 where a view of one split end in section and of the opposed end is shown. The action of the dies brings these two ends to exactly the same section and to exact alignment. This operation corresponds to the stage of the product "c" shown in Figure 10 and is followed by the usual welding operation wherein the ring is held between clamping jaws 19 which grip the flattened portions and force the ends together. The welding is then accomplished by the butt welding method by forcing the ring ends into contact and passing a heavy current through the juncture. The action of this welding is to produce a "flash" or roughened surface "d'" composed of the melted metal of the weld extruded laterally by the welding pressure, as shown in Figure 11, and in Figures 6 and 7, wherein the apparatus used to reduce the flash "d'" is illustrated.

This apparatus consists of an upper movable die 20 and lower fixed die 21 mounted on the ram 21 and bed 23 respectively, of any convenient form of press or metal working machine (not shown). The dies 20, 22 are shaped to conform to the section of the ring and upon the completion of the weld are brought together forcibly on the welded section of the ring preferably while it is still hot, although the action may be accomplished when the weld is cold. The dies as shown are of curved form so that this operation not only spreads out the flash "d'" and flattens it, while still hot, to the section of the ring "d", but also restores the curve of the portion flattened in the preceding operation of preparation for welding. It is obvious that either of these steps is of value by itself and the scope of the invention is not to be limited to the combination thereof, since it may be just as desirable to produce a sound weld by this method with a small amount of flash which is not removed, as it would be to remove such flash. An example of this would be in the formation of the links of welded chain.

The nice meeting of the trimmed ends obtained by the method of Figures 1 to 4, tends to reduce materially the amount of metal present in the "flash". This, in turn, lightens the work to be done in the succeeding step, Figures 6 and 7, and in part renders such a mode of treatment possible. Were the "flash" of relatively large extent, it would tend to fold up or bend rather than to upset under the action of the dies of Figures 6 and 7. This would produce a flaw or "cold shut" very detrimental to the strength of the ring.

Each and all those modifications of my invention which fall within its generic spirit are intended to be covered by the annexed claims.

What I claim as new and useful is:

1. The method of making rings with side walls of an irregular contour in the plane of the axis which consists in flattening the ends of a split ring of the desired given contour between shaping dies whereby to bring the same into rectilinear abutting relation while preserving the given contour in the plane of the axis, welding said ends, and die pressing into circular form and the said given contour.

2. The method of making rings with side walls of an irregular sectional contour in the plane of the axis which consists in die pressing an arcuate section of a split ring into a straight portion having the given contour in the plane of the axis to bring the ends of the ring into rectilinear abutting relation, butt welding said ends and die pressing the resulting flash to the shape of the ring and said ring into circular form with the said given contour.

In testimony whereof he hereunto affixes his signature.

CHARLES L. WILES.